Jan. 29, 1963   R. MATTHEWS ETAL   3,076,120
RADAR DISPLAYS
Original Filed Nov. 12, 1957   4 Sheets-Sheet 3

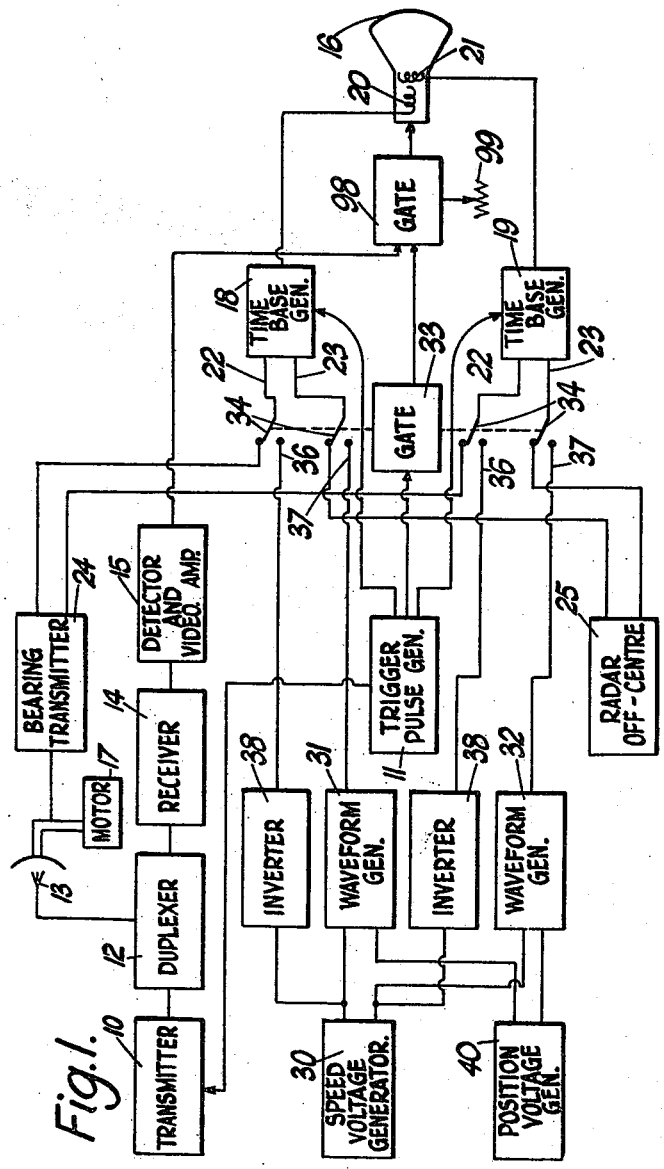

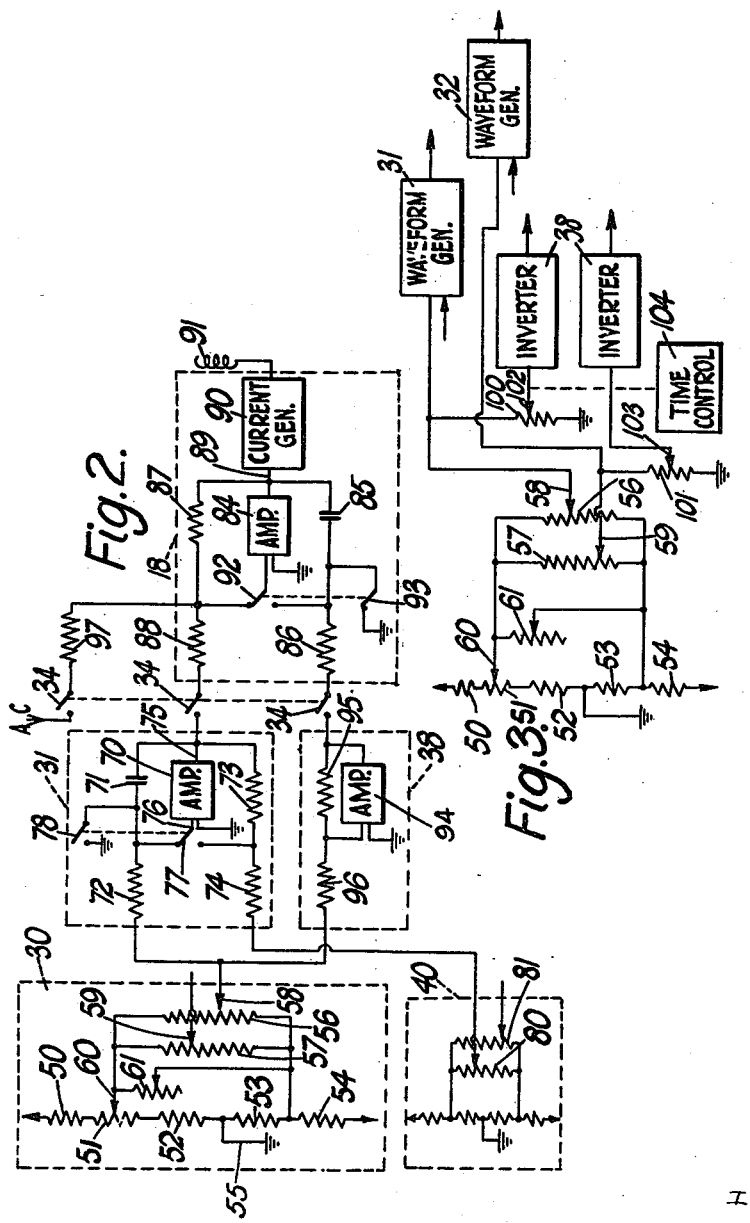

Fig. 4.

INVENTORS
R. MATTHEWS ET AL.
BY Mawhinney & Mawhinney
ATTORNEYS

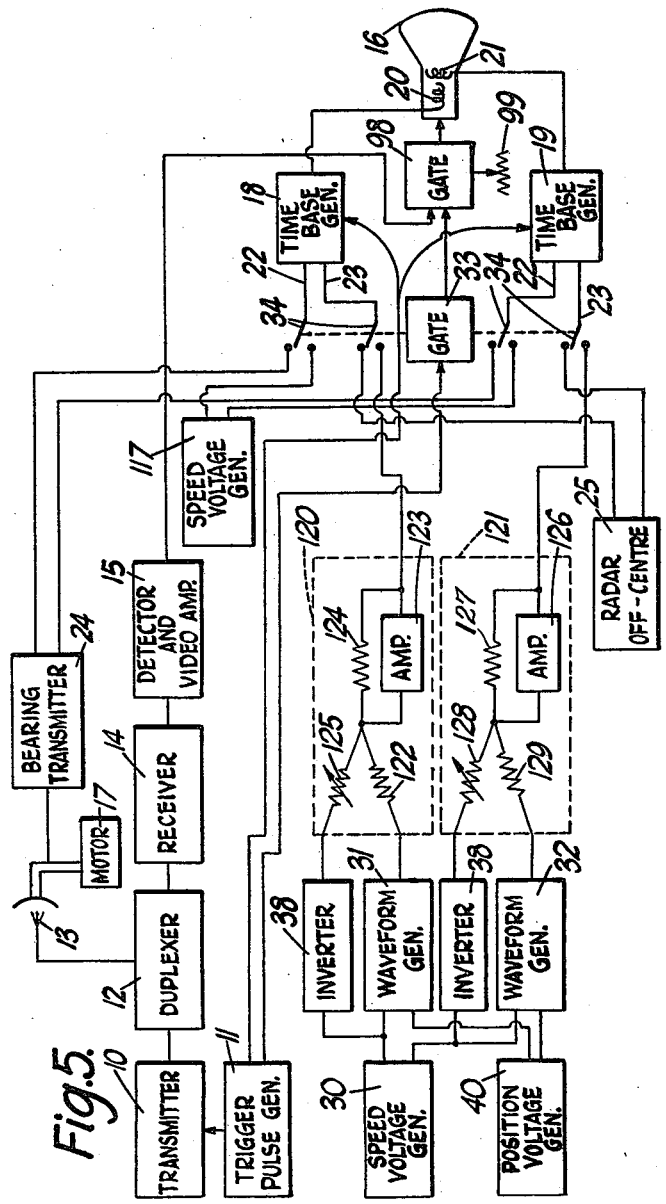

United States Patent Office 3,076,120
Patented Jan. 29, 1963

3,076,120
RADAR DISPLAYS
Robert Matthews and Philip Neville George Knowles, London, England, assignors to Decca Limited, a British company
Continuation of abandoned application Nov. 12, 1957, Ser. No. 695,789. This application May 19, 1960, Ser. No. 32,502
31 Claims. (Cl. 315—26)

This invention relates to radar plan position indicator displays. This application is a continuation of our application Serial No. 695,789 filed November 12, 1957 now abandoned.

For many purposes, for example for controlling aircraft, it is necessary to identify and follow certain particular responses on a plan position type of radar display, and for this purpose it has been proposed to provide an adjustable electronic marker on the screen of the display, which marker can be set to any position on the display by manual adjustment of the control knob. In practice, however, it proves difficult for an operator to move the control knob steadily so that the marker continuously follows the response to be tracked due to the fine degree of control required over a large range of movement, and it is one of the objects of the present invention to provide improved means for marking and following a response on a plan position indicator display.

According to this invention, a radar plan position indicator display, wherein electronic means are provided for producing a marker on the display screen in the intervals between the radar display traces, is characterised in that the marker is controlled in position by adjustable linearly varying voltage waveform generating means arranged so that the marker is displayed in positions which are displaced successively across the screen in a direction and at a rate dependent on the adjustable setting of said linearly varying voltage waveform generating means. It will be understood that the said linearly varying voltage waveform generating means would have to produce output signals varying linearly with time but which vary very slowly compared with, for example, the scanning time bases for the radar display, but this presents no difficulty.

The marker need not necessarily be displayed in every successive interval between the radar scans but might be displayed, for example, in alternate intervals or only after many scans.

In a plan position indicator having a cathode ray tube with fixed deflector means, the position of the marker may be varied by adjusting voltages or currents applied to the deflector means. In general the deflector means, e.g. deflector coils, will be arranged to give deflections in two directions at right angles, and in this case, phase quadrature modulations may be applied to the two sets of deflector means so that the marker will appear as a circle. The size of the circle may be adjusted by controlling the amplitude of the modulation.

The adjustable linearly varying voltage waveform generating means may comprise a pair of integrators to generate sawtooth waveforms, each comprising a high gain amplifier with a capacitive feedback circuit and a resistive input circuit and an adjustable sine-cosine signal generator arranged to feed sine and cosine voltages respectively to the resistive inputs of the two intergrators. Said adjustable sine-cosine signal generator may comprise a sine-cosine potentiometer fed from a direct current supply source. This sine-cosine potentiometer may be operated by a joy-stick type of control or by a knob having a pointer co-operating with a calibrated scale. Each of said integrators may also have a resistive feedback circuit and a second resistive input circuit switchable into operation to determine the starting level of the linearly varying voltage waveform output and there may be provided a second adjustable sine-cosine signal generator or two independent manually controlled potentiometers arranged to feed sine and cosine signals to the second resistive inputs of the two integrators respectively. This second adjustable sine-cosine signal generator may comprise a potentiometer fed from a direct current supply source. When the capacitive feedback circuit is connected across the amplifier, this arrangement will act as a Miller time base generator generating a sawtooth output voltage varying at a rate depending on the potential applied to the associated input resistor. On the other hand when the amplifier input is connected to the resistive feedback circuit, this arrangement will generate a constant voltage output, which will depend on the voltage applied to the second resistive input circuit. It will be seen that by this arrangement, if the input circuit associated with the resistive feedback is connected to a manually-controlled potentiometer, a steady output voltage of adjustable magnitude may be obtained. The plate of the capacitor in the capacitive feedback circuit of each linearly varying voltage waveform generating means, which is connectable to the input of the amplifier, may be connected to earth when the resistive feedback is connected across the amplifier so that this capacitor will be charged to this steady output voltage and thus when the input terminal of the amplifier is switched to the capacitive feedback circuit, the linearly varying voltage output will start from a value dependent on the setting of the aforementioned manual control. The resistive input associated with the capacitive feedback circuit has to have a voltage applied to it corresponding to the required rate of deflection in the appropriate direction. For this purpose, there may be provided an adjustable potentiometer which is balanced about earth, for example by having a series resistance network of fixed resistors balanced about earth with an adjustable shunt resistance across it. The potential developed across the adjustable potentiometer is to be adjustable in accordance with the required speed of movement of the marker on the display, and the control for it may be calibrated in accordance with the corresponding actual velocity of the radar target. The voltage developed across this potentiometer is then applied across a sine and cosine potentiometer to develop sine and cosine signals which are applied respectively to the appropriate input circuits of the two aforementioned linearly varying voltage waveform generating means. With the arrangement just described, two output voltages are developed which may be manually adjusted to values corresponding to two deflection coordinates but, by operation of the switches for the two amplifier inputs, these voltages will then slowly vary at rates corresponding to the components in an adjustable direction of a speed corresponding to the setting of a potentiometer.

It will be seen that said first sine-cosine signal generator controls the direction and rate of movement of the marker on the display screen while said second sine-cosine signal generator controls the initial positioning of the marker. Thus by controlling the setting of these two sine-cosine signal generators and the input voltage to the first sine-cosine signal generator the position of the marker and its rate of movement can be controlled as desired. Switch means may be provided to enable the marker to be controlled, either by said waveform generating means or by a manual control, which manual control may, for example, be a joy-stick controlling two potentiometers for controlling currents in two sets of deflector coils if the display is of a fixed coil type.

The two outputs of the above described linearly varying voltage waveform generating means may be applied directly as shift signals to deflector means of a cathode ray tube, and are preferably modulated with phase quadrature signals to provide a circle marker.

Instead of applying these voltages directly to the generator means, in a display system such as is described in the specification of United States Patent No. 2,849,708 these voltages may be applied to control interscan traces. To provide a simple marker, the interscan waveform generators of this display may be arranged to supply constant output voltages, but this arrangement offers the further facility that these interscan generators may be arranged to produce a trace in the screen starting from the required marker spot and having a length and direction corresponding to the speed and direction of movement of the marker spot. For this purpose, the aforementioned output voltages from the linearly varying voltage waveform generating means may be applied as shift voltages for determining the position of starting of the interscan trace in the manner described in the aforementioned specification, and scanning control voltages for determining the rate of scanning may be derived from the aforementioned sine-cosine potentiometer. To make this interscan trace point in the direction of movement and not back along the track, the sine-cosine voltages have to be inverted for example by separate paraphase ampliers.

For some purposes, however, it may be required that the interscan trace points back along the track from a marker point such as a circle marker, for example in a radar with a low aerial speed, tracking of high speed target is assisted if the end of the prediction vector is positioned on the afterglow of an echo so that, if the speed and direction of travel are correctly set, the next response would paint within the marker circle. The marker circle can then be set to move immediately after the paint occurs and the direction control can be set using the afterglow tail as an indication of the future movement of the target.

In an arrangement having a cathode ray tube with fixed deflector means, scanning waveform generators may be provided for producing deflection signals for the deflector means of the cathode ray tube, each scanning waveform generator comprising a high gain amplifier with a first resistive input circuit and a capacitive feedback circuit to produce a sawtooth output waveform having a slope dependent on the voltage applied to the first resistive input circuit and also having a second resistive input circuit associated with a resistive feedback circuit for the amplifier to produce an output signal of a constant level when a constant input voltage is applied to said second resistive input circuit, the two feedback circuits being connected together at the output of the amplifier so that the capacitive circuit is charged to a level dependent on the output level of the second resistive feedback circuit when the latter is operative. The outputs of said adjustable linearly varying voltage waveform generating means may then be applied to said second resistive input circuits of the respective scanning waveform generators for the corresponding co-ordinate directions of deflections of the cathode ray beam. When the capacitive feedback circuit is connected across the amplifier, this arrangement will act as a Miller time base generator generating a sawtooth output voltage varying at a rate depending on the potential applied to the associated input resistor. On the other hand when the amplifier input is connected to the resistive feedback circuit, this arrangement will generate a constant voltage output, which will depend on the voltage applied to the second resistive input circuit. By applying the output of said adjustable linearly varying voltage waveform generating means to the second resistive input circuits, the scanning waveform generators are conditioned to produce waveforms starting from levels corresponding to a point determined by the adjustable linearly varying voltage waveform generating means, that is to say, the required co-ordinate position of the marker on the screen of the display tube. Signals corresponding to the components, in the two co-ordinate scanning directions of the rate of change of position of said marker may be applied to the first resistive inputs of said waveform scanning generator to produce a line trace on the cathode ray tube screen in a direction corresponding to the direction of movement of the marker. The signals applied to said first resistive inputs may be derived from the signals controlling the waveform slopes of the aforesaid adjustable linearly varying voltage waveform generating means.

A gating circuit may be provided for limiting the duration of the aforementioned line trace, this gating circuit most conveniently controlling the duration of a brightening pulse applied to the display tube. To control the length of the line trace appearing on the display screen, ganged adjustable potentiometers may be provided for scaling the magnitudes of the signals applied to the first resistive inputs of said second waveform generators. Since these signals control the waveform slopes, by scaling these signals while keeping the gate duration constant, the length of the displayed line trace may be varied. Alternatively the length of this trace may be controlled by making the gating circuit an adjustable duration gating circuit.

It will be seen that this arrangement enables the display to be provided with a marker which will conveniently be in the form of a ring around the response, the marker having a line extending from it showing the direction and the rate of movement of the response. For interception purposes, two such separate markers may be provided, one for the target and one for the intercepting craft. It will be appreciated that the first sine-cosine signal generator may be calibrated directly in bearing and in speed so that the rate of movement of the marker and its direction of movement and the length and direction if the line trace may be readily set to given values or so that the speed and direction can be determined if the marker has been made to follow a radar echo. The adjustable gating circuit or the aforementioned ganged adjustable potentiometers may be calibrated in time so that the ends of the various interscan traces will indicate the predicted positions of the various craft at a future time dependent on the setting of the ganged potentiometers. Thus, for interception purposes, the controller may adjust the speed control associated with the intercepting craft to set it in accordance with the actual speed of that craft, and then he merely has to adjust the ganged time potentiometers or the gating circuit and the direction potentiometer for the intercepting craft in such a manner that the ends of the two vectors formed by the two interscan traces meet. The setting, thus obtained, of the direction potentiometer then gives the required track for intercepting craft.

For control of aircraft for interception purposes, it may be preferable to tie a further interscan vector to the end of the aforementioned vector representing the movement of the target. This may be done either by pulse sampling the sawtooth waveform representative of the vector tied to the target marker or more simply by adding algebraically, for each co-ordinate direction, the voltage corresponding to the target marker position to the voltage representative of the appropriate component of speed of the target (the latter voltage may be taken from the aforementioned sine-cosine potentiometer) to provide the necessary shift voltages for the start of the further interscan vector. It will be understood that the voltages from the sine-cosine potentiometer may be scaled if necessary by means of further potentiometers to give the effect of varying the length of the line tied to the target marker. If an interscan vector tied to the end of the target vector is produced in this manner, this vector may be set to the speed of the intercepting craft and can be rotated freely so that, by adjusting the time scale in the manner described above, it can readily be seen if any intercepting craft is in position to effect interception and the time necessary for this interception.

In one arrangement for tying an interscan vector to the end of a line representing the speed and direction of movement of a marker, a radar plan position indicator display is provided with adjustable sawtooth waveform generating means arranged to generate two repetitive synchronised sawtooth waveforms having adjustable slopes corresponding to the two co-ordinate components of a speed and starting from datum levels corresponding to two co-ordinate components of a position, adjustable linearly varying voltage waveform generating means arranged to produce voltages for controlling said starting datum levels to correspond to positions which are displaced in a direction and at a rate dependent on the adjustable setting of said linearly varying voltage waveform generating means, pulse sampling demodulator means controlled by sampling pulses synchronised to occur at a predetermined time after the start of said sawtooth waveforms which demodulator means are arranged to sample the amplitudes of said sawtooth waveforms at the instant of occurrence of the sampling pulses and to produce output voltages corresponding to the sampled magnitudes, a cathode ray display tube, and means for controlling the position of a marker on the screen of the display tube in accordance with the outputs of the pulse sampling demodulator means. This marker may be displayed on the screen of the cathode ray tube in the intervals between the radar display cases. It will be appreciated furthermore that, if such a marker is tied to the end of a first line trace, it is not necessary to display the first line trace on the screen of the cathode ray tube although it may be displayed if desired.

In the arrangement described in the preceding paragraph, if the cathode ray tube has fixed deflector means with associated scanning waveform generators, each scanning waveform generator may comprise a high gain amplifier with a first resistive input circuit and a capacitive feedback circuit to produce a sawtooth output waveform having a slope dependent on the voltage applied to the first resistive input circuit and also having a second resistive input circuit associated with a resistive feedback circuit for the amplifier to produce an output signal of a constant level when a constant input voltage is applied to said second resistive input circuit, the two feedback circuits being connected together at the output of the amplifier so that the capacitive circuit is charged to a level dependent on the output level of the second resistive feedback circuit when the latter is operative and the outputs of said pulse sampling demodulator means may be applied to said resistive feed-back circuits. It will be seen that the outputs of the pulse sampling demodulator means controls the output level of the scanning waveform generators when the resistive feedback circuit is operative. An adjustable sine-cosine signal generator may be provided for applying sine and cosine signals to the first resistive input circuits of the scanning waveform generators for the respective co-ordinate directions of deflection to produce a line trace on the screen starting from the position determined by the outputs of said pulse sampling demodulator means and extending in a direction determined by the setting of the said adjusting sine-costine signal generator. A gate circuit may be provided for determining the duration of the line trace starting from the position determined by the outputs of the pulse sampling demodulator means and means provided either for varying the duration of this line trace or for scaling the inputs from the sine-cosine signal generator to the scanning waveform generators so as to vary the length of the line trace displayed on the screen of the tube.

As a further application of the invention, for air traffic control purposes it is possible to apply markers to various responses corresponding to selected aircraft, each marker having tied to it an intersecan line representative of the rate and direction of movement of the craft. The positions of the ends of these lines may then be fed to a further display to mark points thereon, which thus will indicate the future position of the various aircraft. Simply by adjustment of the time scale in the manner described above, the future position at various times can be seen at will. This further display may thus be provided with a single control knob calibrated in time so that the controller can operate this knob and thus see, of any desired time in the future, the predicted position for all the selected aircraft.

According to a further feature of the invention a cathode ray tube display apparatus comprises a cathode ray display tube, first and second sine-cosine signal generators, a first waveform generator arranged to produce a linearly varying voltage output starting from a datum determined by the sine output of the first sine-cosine signal generator and having a waveform slope determined by the sine output of the second sine-cosine signal generator, a second waveform generator arranged to produce a linearly varying voltage output starting from a datum determined by the cosine output of the first sine-cosine signal generator and having a waveform slope determined by the cosine output of the second sine-cosine signal generator, and means for deflecting the beam of the cathode ray tube in two orthogonal directions in accordance with the amplitudes of the outputs from the two waveform generators. The aforesaid means for deflecting the beam of the cathode ray tube may comprise, for each of said orthogonal directions, a further waveform generator, the two further waveform generators being arranged to produce respectively sawtooth waveform outputs starting from datum levels determined by the amplitudes of the output from said first and said second waveform generators respectively and having waveform slopes determined by the sine and cosine outputs respectively of said second sine-cosine signal generator. The outputs of said further waveform generators may be applied to orthogonal deflector means of the cathode ray tube to control the position of the cathode ray beam.

The following is a description of a number of embodiments of the invention, reference being made to the accompanying drawings, in which:

FIGURE 1 is a block diagram illustrating a pulse-radar apparatus having a plan position indicator display with means for producing a marker trace on the display;

FIGURE 2 is a circuit diagram illustrating in further detail parts of the apparatus of FIGURE 1;

FIGURE 3 is a circuit diagram illustrating a modification of the arrangement of FIGURE 2; and FIGURES 4 and 5 are a block diagram illustrating other forms of radar apparatus and display system.

Referring to FIGURE 1, there is illustrated diagrammatically pulse radar apparatus comprising a transmitter 10 arranged to generate repetitive short duration microwave frequency pulses in synchronism with the output of a trigger pulse generator 11. Pulses from the transmitter 10 are fed through a duplexer 12 to a directional scanning antenna 13. Echoes of these signals from distant targets which are picked up by the antenna 13, after passing through the duplexer 12, are fed to a receiver 14 and thence to a detector and video amplifier stage 15 before being applied to the grid-to-cathode circuit of a cathode ray tube 16 to give a brightness modulation of the cathode ray beam. The directional antenna 13 is continuously rotated in the azimuthal plane by a motor 17. The cathode ray tube 16 is arranged to display the radar signals as a plan position display and for this purpose two time base generators 18, 19 producing sawtooth scanning waveforms are connected respectively to feed orthogonal deflection coils 20, 21 for deflecting the cathode ray beam. As will be described in further detail later, the time base generators 18, 19 are each controlled by two direct voltages one of which determines the rate of scan, that is to say the slope of the waveform, and the other the level from which the scan starts. These inputs are shown respectively at 22, 23. For convenience these two control voltages (and the equivalent control voltages of other sawtooth waveform generators) will be referred to hereinafter as the rate control and shift control voltages respectively. The initiation of the scan is controlled by the trigger pulse generator 11. The rate control voltages controlling the rates of scan in the two orthogonal directions are provided by a bearing transmitter 24 which might comprise, for example, an alternating current energised magslip producing two modulated outputs which are demodulated by separate pulse sampling demodulators to provide the two direct voltages representative of the sine and cosine of the angular position of the antenna. The shift control inputs for the time base generators 18, 19 are controlled, during the radar display scans, by an off-centering signal generator 25 which may comprise, for example, a manually controlled sine-cosine potentiometer. It will be seen that the arrangement thus far described provides in the known manner a radar plan position display on the screen of the cathode ray tube 16. The arrangement shown in FIGURE 1 also provides the marker trace on the screen of the cathode ray tube. This marker trace is arranged to appear as an interscan trace between successive radar display scans. Apparatus for providing interscan traces is described and claimed in the specification of the aforementioned United States Patent 2,849,708. In the arrangement of FIGURE 1, the interscan display is obtained using the time base generators 18, 19 by switching the rate and shift control input circuits, during the intervals between radar display scans, to sources of rate and shift control voltages such as to control the time base generators 18, 19 to produce the required marker trace as an interscan display. The marker trace in the arrangement of FIGURE 1 is a line trace having a starting point which moves across the screen at an adjustable rate and in an adjustable direction. The rate and direction of movement of the starting point of this marker trace is controlled by a speed control signal generator 30 which will be described in further detail later and which produces two voltages representative of the sine and cosine of the required direction and having magnitudes proportional to the required components and speed. These two speed components are fed respectively as rate control inputs to two waveform generators 31, 32 which produce linearly varying voltage waveform outputs having slopes proportional to the two speed components. These linearly varying voltage waveforms would have duration very great compared with the radar scanning periods, and, in a typical case, the outputs of the generators 31, 32 might be a voltage which varies linearly but very slowly for a period of many minutes. These outputs are used to control the starting position of the aforementioned interscan marker trace. For this purpose switches 34 are provided in the aforementioned input circuits 22, 23 of the time base generators 18, 19, which switches are controlled by a gate pulse generator 33, synchronised with the trigger pulse generator 11, and serve to switch the inputs to the time base generators 18, 19, during the interscan periods, from the aforementioned bearing transmitter 24 and off-centering signal generator 25 to alternative input circuits 36, 37, the circuits 36 being for applying interscan rate control voltages to the rate control circuits 22 of the time base generators 18, 19 and the circuits 37 being for applying interscan shift control voltages to the shift control circuits 23. The outputs of the aforementioned waveform generators 31, 32 are fed to the circuits 37 and thus control the starting points of the interscan traces. If the input circuits 36 were earthed so that no rate control inputs were applied during the interscan periods, it will be seen that the time base generators 18, 19 would merely produce a marker spot on the screen of the cathode ray tube during the interscan periods, which marker spot would slowly move across the screen of the tube at a rate and in a direction determined by the speed control signal generator 30. In the arrangement illustrated in FIGURE 1 however, the sine and cosine speed components are applied through inverters 38 to the scanning rate control input circuits 36 so as to produce a trace during the interscan periods extending in a direction corresponding to the direction determined by the setting of the speed control signal generator 30. Without the inverter the trace would extend in the opposite direction. The length of this interscan marker trace is determined by the gate circuit 33 which controls the duration of the interscan by effecting operation of the aforementioned switches 34.

To determine the initial position of the start of the interscan marker trace there is provided a position signal generator 40, conveniently a sine-cosine potentiometer controlled by a joy-stick, which produces two output voltages representative of the co-ordinates of the required initial position for the marker trace. These two output voltages are fed respectively to the shift control inputs of the aforementioned waveform generating means 31, 32 so as to control the starting levels of the sawtooth outputs. Thus during the interscan periods there is produced a line trace on the screen of the cathode ray tube having a length and a direction corresponding to the setting of the speed control signal generator 30. The starting point of this line trace slowly moves across the screen of the tube at a rate and in a direction controlled by the speed control signal generator 30, the movement being from an initial position determined by the setting of the position signal generator 40.

The marker trace producing circuits of FIGURE 1 are illustrated in further detail in FIGURE 2. Referring to FIGURE 2, the speed signal generator 30 is shown as comprising a potentiometer chain consisting of a series of resistors 50, 51, 52, 53, 54 connected between two supply terminals which are positive and negative with respect to earth. This potentiometer chain has an earthed tap. A sine-cosine potentiometer, illustrated diagrammatically as two potentiometers 56, 57 with adjustable taps 58, 59, is connected between the junction of the resistors 53, 54 and an adjustable tap 60 on the resistor 51 in the potentiometer chain 50–54. By adjustment of the tap 60, the voltage across the sine-cosine potentiometer can be balanced about earth. The magnitude of this voltage may be adjusted by means of an adjustable shunt resistor 61 connected across the sine-cosine potentiometer. The resistor 61 constitutes a speed control since it determines the magnitude of the voltage across the sine-cosine potentiometer. This latter potentiometer produces sine and cosine components of the applied voltage and constitutes a direction control. It will thus be seen that the unit 30 provides two direct voltage outputs having magnitudes proportional to the components of speed in two orthogonal directions and that both the speed and direction may be adjusted manually. It will be seen from FIGURE 1 that the sine and cosine components are treated in a similar manner and in FIGURE 2 there are illustrated the waveform generator 31, the inverter 38 and the time base generator 18 for only one of the co-ordinate directions of deflection, namely that corresponding to the output from tap 58 on the speed control signal generator 30.

The waveform generator 31, as shown in FIGURE 2, comprises a high gain amplifier 70 having two alternative feedback and input circuits. The first comprises a feedback capacitor 71 and an input resistor 72 whilst the second comprises a feedback resistor 73 and an input resistor 74. The capacitor 71 and the resistor 73 are permanently connected to the output circuit 75 of the amplifier. The input 76 to the amplifier is switchably connected by means of a switch 77 either to the junction of the feedback capacitor 71 and input resistor 72 or to the junction of the feedback resistor 73 and the input resistor 74. The switch 77 is operated simultaneously with a second switch 78 which serves to earth the input side of the capacitor 71 when the switch 77 connects the input of the amplifier to the junction of resistors 73, 74. In practice, an electronic switching arrangement would generally be used for the switches 77, 78. The voltage from the tap 58 of the aforementioned sine-cosine potentiometer is applied to the input resistor 72. When the switch is set so that the feedback and input circuits comprising capacitor 71 and resistor 72 is operative, the amplifier will generate a sawtooth voltage starting from the level to which the capacitor 71 has previously been charged. This level is determined by the voltage applied to the input resistor 74 when the switch is in the other condition, in which the amplifier 70 with the resistors 73, 74 acts as a see-saw circuit so that the potential at the output circuit 75, and hence the potential to which capacitor 71 is charged, varies as the potential applied to resistor 74 but in the opposite direction, the ratio of the input and output potentials being equal to the ratio of the magnitudes of the input and feedback resistors. The input to resistor 74 is derived, in FIGURE 2, from the sine output of the sine-cosine potentiometer 40, illustrated diagrammatically as comprising two separate potentiometers 80, 81 providing respectively the sine and cosine outputs. The cosine output would be fed to the waveform generator 32 of FIGURE 1. It will be seen that the waveform generator 31 of FIGURE 2 generates a sawtooth waveform. The potential applied to the resistor 72 controls the slope of the waveform and thus constitutes a rate control potential while the voltage applied to resistor 74 controls the starting level of the waveform and thus constitutes a shift control potential. The circuit is arranged so that the rate of change of output voltage is very slow, for example, a single sawtooth waveform might have a duration of many minutes. The waveform is not repetitive but is initiated when required by applying power to the circuit.

The time base generator 18 of FIGURE 1 is illustrated in FIGURE 2 as comprising a high gain amplifier 84 having a capacitive feedback and resistive input circuit comprising a feedback capacitor 83 and an input resistor 86 and having a resistive feedback and input circuit comprising a feedback resistor 87 and an input resistor 88. The two feedback circuits are permanently connected to the output of the amplifier 84 and to an output circuit 89 which feeds one of the deflector coils of the cathode ray tube. In FIGURE 2 the output circuit 89 is shown diagrammatically as being connected to a current generator 90 feeding a deflector coil 91. Conveniently for this purpose there may be employed a circuit more fully described in the specification of United States Patent No. 2,994,868 issued August 1, 1961 and entitled "Radar Display Apparatus" in which the grid to cathode circuit of a current generator valve, the anode circuit of which contains the deflector coil, is connected in the feedback path of the time base generator amplifier. The input to the amplifier 84 can be switchably connected by means of an electronic switch 92 to either of the two resistive input circuits 86, 88 so that one or other of the two input and feedback circuits is then made operative. Operable synchronously with the switch 92 is a further electronic switch 93 for earthing the input side of capacitor 83 when the input and feedback circuit 87, 88 is operative. It will be seen that this time base generator is similar in construction to the waveform generator 31 and it operates in a similar way to generate a sawtooth output waveform having a slope dependent upon the potential applied to the input resistor 86 and starting from a datum level dependent upon the potential applied to the input resistor 88. The output from the waveform generator 31 developed at the output circuit 75 is fed to the input resistor 88 of the time base generator 18. The sine component of the speed control voltage developed at tap 58 is fed through an inverter 38 to the resistive input 86 to control the slope of the sawtooth waveform. This inverter 38 is illustrated as comprising a high gain amplifier 94 with feedback circuit comprising resistor 95 and an input circuit comprising resistor 96. The resistors 95 and 96 are made equal so that the inverter gives an output of the same magnitude as the input but of opposite polarity. The waveform generator 31 thus controls the starting level of the sawtooth output from the time base generator 18 while the speed control voltage potentiometer 56 controls the slope. The output sawtooth waveform is repetitive and is synchronised to occur in the intervals between the radar display traces by suitable timing of the operation of the switches 92, 93 which are controlled by the gate pulse generator 33 of FIGURE 1. The switches 92, 93 need not be operated to produce this interscan waveform after each radar display scan; these marker trace generating signals might only be produced and displayed after, for example, every fourth radar display scan.

It will be seen that the waveform generating circuit 31 will produce a linearly varying output having a slope dependent on the voltage at the tap 58, that is to say, the voltage dependent upon the speed in the co-ordinate direction. The output waveform from the waveform generator 31 will start from a datum level dependent on the setting of the sine component from the sine-cosine potentiometer 80, 81. As previously explained, the waveform generator 31 is arranged to produce an output signal which varies very slowly compared with, for example, the scanning time bases for the radar display and this signal forms the shift control input for the scanning waveform generator 18, thus causing the starting point of the trace produced by that scanning waveform generator to move slowly across the screen of the cathode ray tube. As is clear from FIGURE 1, there are two time base generators 18, 19 with associated control circuits which are operated in synchronism so that the starting point of the trace produced by the combined effect of the deflections of the cathode ray beam due to the two scanning waveform generators will move across the screen of the tube in a direction dependent on the setting of the sine-cosine direction control potentiometer 56, 57 and at a speed dependent on the setting of the speed control resistor 61. The starting point for this slow movement of the trace is determined by the setting of the position control potentiometer 80, 81. If it is merely required to produce a marker in the form of a small circle centred on the position to be indicated by the marker, this may be effected, as previously indicated, by feeding phase quadrature voltages into the shift control inputs of the two time base generators 18, 19. For this purpose, as illustrated in FIGURE 2, there is provided a resistor 97 connected to the junction of the resistors 87, 88 in the time base generator circuit 18 and the appropriate phase quadrature voltage is applied through this resistor 97. This phase quadrature input would only be applied during the appropriate interscan period, its application being controlled by a further switch unit of the aforementioned switch 34. The resistor 97 forms an additional input resistor so that the two input voltages, one being from the waveform generator 31 and the other being one of the phase quadrature signals, are added algebraically.

The inverters 38 apply the speed component signals to the scan control inputs of the time base generators 18, 19 so that the latter will generate line scan waveforms. By using the two inverters 38, the trace on the screen of the tube produced by these waveforms is made to extend from the marker spot indicated by the small circle in a direction indicating the direction set into the potentiometer 56, 57. The length of this line scan trace on the screen of the tube is dependent on the applied control voltages which determine the absolute slopes of the waveforms generated by the time base generators 18, 19 and on the length of the gate determining the duration of the interscan waveform period. For this purpose, most conveniently there is provided a further gating circuit 98 controlling the application of the video signals and brightening pulses to the cathode ray tube, the duration of the interscan trace brightening pulses being controlled, as indicated diagrammatically by the potentiometer 99 in FIGURE 1 so that the length of the line trace can be set as required.

If the phase quadrature voltages are fed to the shift control inputs of the time base generators 18, 19 to be added algebraically to the voltages from the waveform generators 31, 32, the interscan line trace will start from a point on the circle marker produced by the phase quadrature voltages and not from the centre of the circle. Since the circle will usually be very small, this starting of the trace from a point on the circle will generally be immaterial. If necessary however, the circle marker and the line trace may be gated to appear in separate interscan periods.

It will be seen that the arrangement described with reference to FIGURES 1 and 2 enables a radar display to be provided on the screen of the cathode ray tube 16 with a marker in the form of a circle which may be placed in any desired position by setting the sine-cosine potentiometer 80, 81. The circle may, for example, be positioned to mark a particular radar response. Extending from this marker circle is a marker line showing the direction and rate of movement as determined by the settings of the sine-cosine potentiometer 56, 57 and the speed control resistor 61. The marker circle and line moves across the screen of the tube in this direction and at this rate. Thus, by setting the sine-cosine potentiometer 56, 57 and the speed control resistor 61 to the direction and rate of movement of a particular radar response, the marker will follow this response. For interception purposes, two such separate markers may be provided, one for the target craft and one for the intercepting craft. The ends of the two marker lines will indicate the predicted position of the two craft at some future time. By altering the length of the two marker traces in similar proportions, that is to say, by operations of the controls 99 for these two traces, the predicted positions of the two craft at different future times may be displayed. In carrying out an interception, the controller may, for example, adjust the speed control resistor associated with the intercepting craft to set it in accordance with the possible speed of that craft and thus he merely has to adjust the time control potentiometers 99 for the two marker traces, which potentiometers preferably are ganged together, and the direction control sine-cosine potentiometer for the intercepting craft in such a manner that the two ends of the two vectors formed by the two interscan line marker traces meet, preferably after the shortest possible time. The setting thus obtained of the direction control sine-cosine potentiometer for the intercepting craft then gives the required track for this craft to effect an interception.

Instead of adjusting the length of the gate to control the length of the marker traces, the length of these traces may be controlled by adjusting the voltages fed to the rate control inputs of the time base generators 18, 19 during the interscan periods. One such arrangement for doing this is illustrated in FIGURE 3 which is a circuit diagram similar to part of FIGURE 2 and using similar reference numerals to indicate similar components. In FIGURE 3, however, the outputs from the sine-cosine potentiometer 56, 57 are not fed directly to the inverters 38 but are applied across two ganged potentiometers 100, 101 and the outputs from taps 102, 103 on these two potentiometers are fed respectively to the two inverters 38. These two potentiometers 100, 101 are ganged together and operated manually to constitute a manually operable time control indicated diagrammatically at 104. It will be seen that these ganged potentiometers 100, 101 scale the input voltages to the two inverters, so similarly scaling the output voltages and hence controlling the slopes of the scanning waveforms generated by the time base generators 18, 19 during the interscan periods. In the arrangement of FIGURE 3, a fixed duration gate may be employed for determining the duration of the interscan period.

Figure 4:
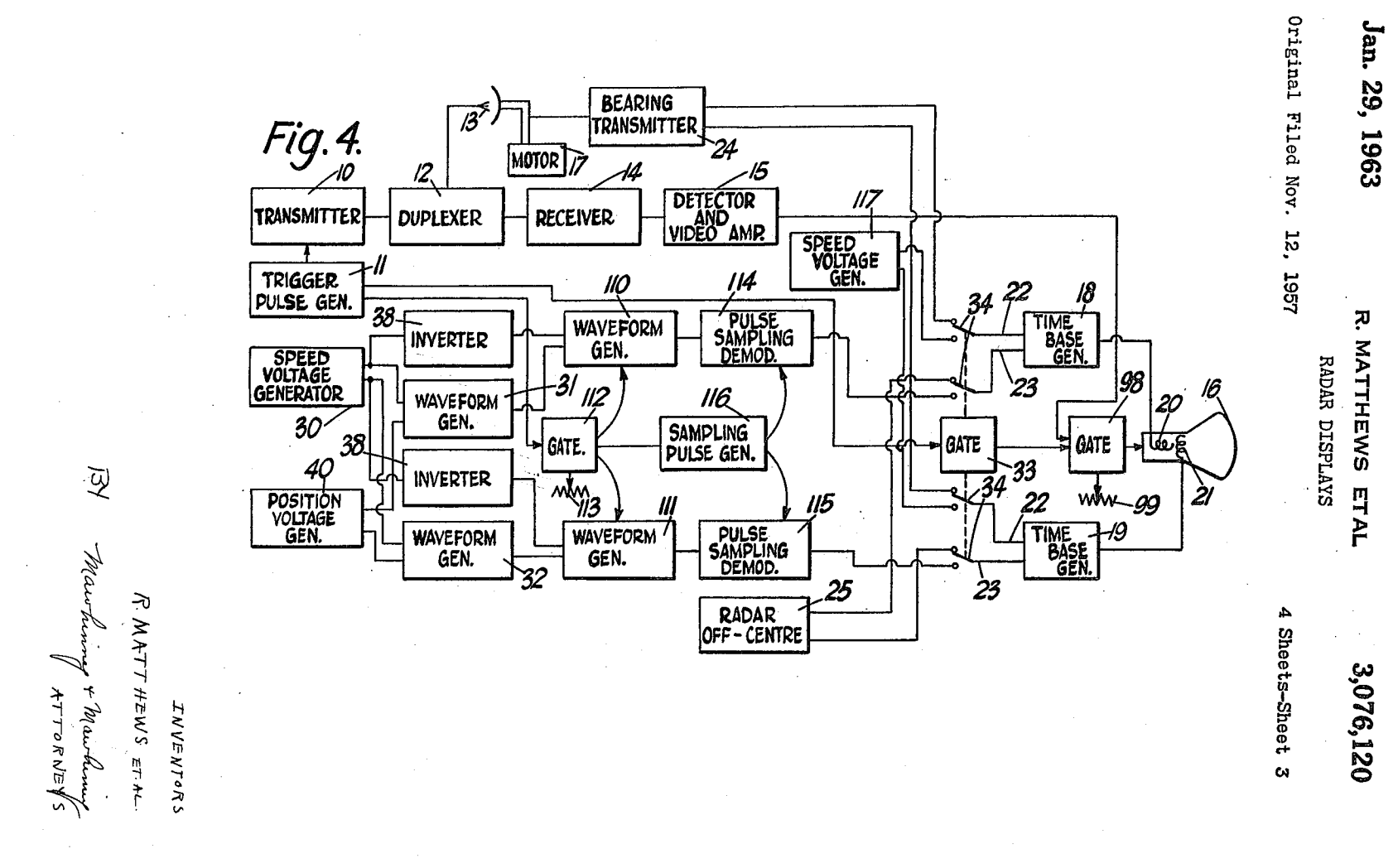

For the control of aircraft for interception purposes, it may be desired to tie a further interscan vector to the end of the above-described line marker trace representing the movement of the target. FIGURE 4 illustrates one way of doing this by pulse sampling a sawtooth waveform representative of the line trace tied to the target marker to provide the necessary shift voltages for controlling the start of the further interscan vector. In FIGURE 4 similar reference numerals to those employed in FIGURE 1 are used to indicate corresponding components and, in the following description, reference will only be made to the distinctive features of FIGURE 4. For simplicity, in FIGURE 4, there is illustrated only means for displaying this further interscan vector without displaying the target marker circle or the line marker extending therefrom. For some purposes it may only be necessary to show the further vector but, if desired, it is readily possible to display also the marker and line trace produced by the arrangement of FIGURE 1. For this purpose, the further vector and the marker and line trace may be arranged as separate interscan displays. It will be appreciated that interscan traces need not occur between every radar display trace and, for example, the various interscan vectors might be arranged to occur as previously indicated at only one-quarter the repetition rate of the radar display traces so that four separate interscan traces can be produced in successive intervals between the radar display traces. These may be produced by the time base generators 18, 19, the switches 34 being arranged to switch the rate and shift control inputs to appropriate sources of signals during the various interscan periods. In this connection, it may be noted that once the position control signal generator 40 has been used for setting the starting levels for the waveform generators 31, 32, it is no longer required until these waveform generators have to be reset i.e. for example when tracking of one target has ceased and tracking of a new target has to commence. Thus if a number of separate marker traces are to be provided, one position control signal generator 40 can be used for controlling the starting levels of all the waveform generators 31, 32 associated with the various different markers.

In FIGURE 4, speed control signal generator 30, which may be similar to the speed signal generator described with reference to FIGURE 2, provides sine and cosine speed component voltages which are fed to the two waveform generators 31, 32 to produce relatively slow speed linearly varying waveforms starting from datum levels determined by the setting of a position signal generator 40 as in the arrangement of FIGURE 1. In FIGURE 4, however, instead of feeding the outputs from the waveform generators 31, 32 directly to the shift control inputs of the time base generators 18, 19 they are fed to the shift control inputs of two waveform generators 110, 111 respectively. These waveform generators 110, 111 may be generally similar in construction to the time base generators 18, 19 and the waveform generators 31, 32 and their rate control inputs are obtained from inverters 38 inverting the speed signal components from the speed control signal generator 30. The waveform generators 110, 111 will thus produce waveforms corresponding to the interscan trace scanning waveforms of the time base generators 18, 19 of FIGURE 1. The duration of these waveforms is controlled by a gating circuit 112 synchronised from the trigger pulse generator 11. The duration of this gate is adjustable, being controlled by means indicated diagrammatically as a potentiometer 113. The outputs from the two waveform generators 110, 111 are fed respectively to two pulse sampling demodulators 114, 115 which serve to sample the sawtooth voltages at an instant determined by a sampling pulse generator 116. This sampling pulse generator is controlled from the gating circuit 112 so that the sampling pulse occurs at the end of the waveform period of the sawtooth waveforms from the generators 110, 111, and thus the pulse sampling demodulators will produce output voltages representative of the instantaneous amplitudes of the sawtooth waveforms from the generators 110, 111 at the ends of the sawteeth. It will thus be seen that these sampled voltages are representative of the position on the screen of the tube of the ends of the marker trace produced by the arrangement of FIGURES 1 and 2. The pulse sampling demodulators 114, 115 hold these voltages between successive sampling pulses so providing direct voltage outputs which are applied through the switches 34 to the shift control inputs 23 of the time base generators 18, 19 and thus they determine the starting position of the interscan trace produced when the switches 34 are in the position engaging the lower contacts of FIGURE 4. If it were required merely to mark this position phase quadrature voltages might be fed into the shift control inputs of the time base generators during the appropriate interscan period in a manner similar to that described with reference to FIGURE 2 so as to produce small circles at these points. In the arrangement of FIGURE 4, however, these points are the starting point of a further vector which extends in a direction determined by the setting of a speed sine-cosine signal generator 117 feeding sine and cosine voltages to the scan control inputs in the time base generators 18, 19. This speed voltage generator 117 may be similar to the speed voltage generator 30 described with reference to FIGURE 2. If the interscan has a fixed duration determined by a fixed duration brightening pulse, the length of the displayed interscan trace may be varied by the use of ganged potentiometers in the two outputs from the speed voltage generator 117 in a manner similar to that described with reference to FIGURE 3. Alternatively, the length of the displayed interscan trace may be varied by varying the duration of the brightening gate for the interscan period. Generally, it will be required that, if the length of this interscan is to be varied, its starting point will also have to be altered to correspond to the different future time represented by the end of the interscan and, for this purpose, the time control 113 for the waveform generators 110, 111 and the time control 99 for the interscan length would be ganged together.

In controlling an interception, the interscan vector produced by the arrangement of FIGURE 4 may be set to the speed of the intercepting craft and can be rotated freely by means of the speed voltage generator 117 which determines the two speed components and hence controls the direction as well as the speed to be represented by the generated speed component signals. Thus by setting the speed voltage generator 30 and the position signal generator 40 so that the inputs to the waveform generators 110, 111 follow the movements of the target and by adjusting the time scale in the manner previously described, it can readily be seen, on rotating the interscan vector produced by the arrangement of FIGURE 4, if any intercepting craft is in a position to effect interception and the time necessary for this interception.

If it is required to display on the radar display screen the target vector such as has been described with reference to FIGURES 1 and 2, the inputs to the waveform generators 110, 111 may be applied, during a further interscan period, directly to the corresponding scan and shift control inputs of the time base generators 18, 19 so as to produce the required interscan marker trace.

FIGURE 5 illustrates a simplified form of apparatus which may be used, in some circumstances, for tying a further vector on to the end of a target vector. In FIGURE 5 the same reference characters are used as in FIGURE 4 to indicate corresponding components and, in the following description, mention will only be made of the distinctive features of FIGURE 5. In an arrangement of FIGURE 5, the outputs from the waveform generators 31, 32 are added algebraically to the appropriate speed components to produce shift control components for the time base generators 18, 19 by means of adding circuits 120, 121. As shown in FIGURE 5, the output from the waveform generator 31 is fed through an input resistor 122 of a high gain amplifier 123 with a resistive feedback circuit 124. The speed voltage generator 30, which may be similar to that described with reference to FIGURES 2 and 3, provides sine and cosine outputs balanced about earth. One of the outputs is fed to a further resistor 125 connected to the junction of the aforementioned resistors 122, 124. It will be seen that the speed component voltage is added algebraically to the slowly changing output from the waveform generator 31 to produce the output from the unit 120, which output is fed as an interscan shift control voltage to the time base generator 18. Similarly the other adding circuit 121 comprising a high gain amplifier 126 with a feedback resistor 127 and two input resistors 128, 129 adds the other speed component from the speed voltage generator 30 to the output from the waveform generator 32 to provide the shift control voltage for the time base generator 19. The appropriate components of speed voltage from the speed voltage generator 117 are fed to the rate control inputs of the time base generators 18, 19 to control the slopes of the scanning waveforms. The arrangement of FIGURE 5 might be further simplified in some cases by using the time base generators 18, 19 as the adding circuits, the two voltages to be added, that is the output from the speed control generator 30 and the output from the waveform generator 31 or 32, being fed through separate input resistors as separate shift control inputs applied simultaneously to a time base generator during the interscan period.

The length of the displayed interscan traces in the arrangement of FIGURE 5 may be controlled by altering the length of the brightening pulses applied to the cathode ray tube by means of the control 99 as in the arrangements of FIGURES 1 and 4, but it is also necessary to vary simultaneously the resistors 125 and 128 to change the speed component fed into the units 120, 121.

The circuit arrangement of FIGURE 5 is simpler than that of FIGURE 4 but, in the arrangement of FIGURE 5, the two resistors 125, 128 have to be varied simultaneously and, while this is suitable for a single marker, the number of mechanically ganged variable resistors required for a multiple marker system makes the arrangement of FIGURE 4 (in which a single potentiometer 113 is used for this control) preferable for a multiple marker system.

It will be appreciated that although the arrangements which have been described with reference to FIGURES 1, 4 and 5 display the radar signals on the display screen, this is not necessary. For many purposes, it may be preferred to display only interscan signals such as those representative of the movements and/or predicted movements of selected craft. The positions of the marker circles and lines on one display tube may be controlled if necessary by operators at one or more other tubes some or all of which may have radar displays. For example, one display may be arranged to show only predicted future positions of a number of aircraft. This display might be provided with a single control knob calibrated in time for adjusting simultaneously the time scales of all the displayed marker so that the controller, by operating this knob, can see, for any desired time in the future, the predicted position of all the selected aircraft.

We claim:

1. In a radar plan position indicator display having a cathode ray tube display screen with a repetitively scanned radar display trace which is angularly rotated on the screen; electronic marker generating means for producing a marker on the display screen in the intervals between the radar display scans in a position determined by applied control voltages, and two voltage waveform generating means arranged to feed two linearly varying voltages to said electronic marker generating means as control voltages, said waveform generating means each including means for varying the rate of change with time of the output voltage so that the marker is displayed in positions which are displaced successively across the screen in a direction and at a rate dependent on the adjustable setting of said voltage waveform generating means.

2. In a radar plan position indicator display having a cathode ray tube with fixed deflector means for effecting deflection of the cathode ray beam across the tube screen in two co-ordinate directions and having a repetitively scanned radar display trace which is angularly rotated on the screen to give a plan position display; electronic marker generating means for applying signals to said deflector means in the intervals between the radar display scans to produce a marker in a position determined by applied control voltages, and two voltage waveform generating means arranged to feed two linearly varying voltages to said electronic marker generating means as control voltages, said waveform generating means each including means for varying the rate of change with time of the output voltage so that the marker is displayed in positions which are displaced successively across the screen in a direction and at a rate dependent on the adjustable setting of said voltage waveform generating means.

3. A radar plan position indicator display as claimed in claim 2 wherein scanning waveform generators are provided for producing deflection signals for the deflector means of the cathode ray tube, each scanning waveform generator comprising a high gain amplifier with a first resistive input circuit and a capacitive feedback circuit to produce a sawtooth output waveform having a slope dependent on the voltage applied to the first resistive input circuit and also having a second resistive input circuit associated with a resistive feedback circuit for the amplifier to produce an output signal of a constant level where a constant input voltage is applied to said second resistive input circuit, the two feedback circuits being connected together at the output of the amplifier so that the capacitive circuit is charged to a level dependent on the output level of the second resistive feedback circuit when the latter is operative and wherein the outputs of said adjustable linearly varying voltage waveform generating means are applied to said second resistive input circuits of the respective scanning waveform generators for the corresponding co-ordinate directions of deflection of the cathode ray beam.

4. A radar plan position indicator as claimed in claim 3 wherein means are provided for signals corresponding to the components, in the two co-ordinate scanning directions, of the rate of change of position of said marker to the first resistive inputs of said scanning waveform generators to produce a line trace on the cathode ray tube screen in a direction corresponding to the direction of movement of the marker.

5. In a radar plan position indicator display having a cathode ray tube with fixed deflector means for effecting deflection of the cathode ray beam across the tube screen in two co-ordinate directions and having a repetitively scanned radar display trace which is angularly rotated on the screen to give a plan position display; electronic marker generating means for applying signals to said deflector means in the intervals between the radar display scans to produce a marker, which electronic marker generating means include two scanning waveform generators for producing deflection signals for the deflector means of the cathode ray tube, each scanning waveform generator being arranged to produce a sawtooth waveform starting from a level controlled by a shift control input signal, and having a slope controlled by a rate control input signal, means coupling said scanning waveform generators to said deflector means to produce a marker trace having a form and a starting point controlled by the shift and rate control inputs, two adjustable linearly varying voltage waveform generating means arranged to generate two linearly varying voltages varying at rates dependent on applied input signals, means coupling said linearly varying voltage waveform generating means to said scanning waveform generators to feed said linearly varying voltages respectively as shift control input signals to the two scanning generators so that the marker trace starts in positions which are displaced successively across the screen in a direction and at a rate dependent on the varying output of said linearly varying voltage waveform generating means, a speed signal generator arranged to provide two speed control voltages, means coupling said speed signal generator respectively to the two scanning waveform generators as rate control input signals and means coupling said speed signal generators to said linearly varying voltage waveform generating means to feed said two speed control voltages as input signals for controlling the rates respectively of variation of said linearly varying voltages whereby the marker trace appears on the tube screen as a line extending in the direction of movement of its starting point.

6. A radar plan position indicator as claimed in claim 5 wherein a gating circuit is provided for limiting the duration of said line trace and wherein gauged adjustable potentiometers are provided for scaling the magnitudes of the signals applied to the first resistive inputs of said scanning waveform generators to control the length of the line trace appearing on the display screen.

7. A radar plan position indicator as claimed in claim 5 wherein an adjustable duration gating circuit is provided for limiting the duration of said line trace to control the length of the line trace appearing on the display screen.

8. A radar plan position indicator display wherein there are provided adjustable sawtooth waveform generating means arranged to generate two repetitive synchronised sawtooth waveforms having adjustable slopes corresponding to the two co-ordinate components of a speed and starting from datum levels corresponding to two co-ordinate components of a position, adjustable linearly varying voltage waveform generating means arranged to produce voltages for controlling said starting datum levels to correspond to positions which are displaced in a direction and at a rate dependent on the adjustable setting of said linearly varying voltage waveform generating means, pulse sampling demodulator means controlled by sampling pulses synchronised to occur at a predetermined time after the start of said sawtooth waveforms which demodulator means are arranged to sample the amplitudes of said sawtooth waveforms at the instant of occurrence of the sampling pulses and to produce output voltages corresponding to the sampled magnitudes, a cathode ray display tube, and means for controlling the position of a marker on the screen of the display tube in accordance with the outputs of the pulse sampling demodulator means.

9. In a radar plan position indicator having a cathode ray tube display screen with a repetitively scanned radar display trace; electronic marker generating means for displaying a marker trace on the tube screen in intervals between radar display scans at a position controlled by applied control voltages, adjustable sawtooth waveform generating means arranged to generate two repetitive synchronous sawtooth waveforms having adjustable slopes corresponding to the two co-ordinate components of a speed and starting from datum levels corresponding to two co-ordinate components of a position, adjustable linearly varying voltage waveform generating means arranged to produce voltages for controlling said starting datum levels to correspond to positions which are displaced in a direction and at a rate dependent on the adjustable setting of said linearly varying voltage waveform generating means, a sampling pulse generator generating sampling pulses synchronised to occur at a predetermined time after the start of said sawtooth waveforms, pulse sampling demodulator means controlled by said sampling pulses to sample the amplitudes of said sawtooth waveforms at the instant of occurrence of the sampling pulses and to produce output voltages corresponding to said sampled magnitudes, and means for applying said output voltages to said electronic marker generating means as control voltages to control the position of the marker trace on the cathode ray tube screen.

10. A radar plan position indicator display as claimed in claim 8 wherein said cathode ray tube has fixed deflector means with associated scanning waveform generators, each scanning waveform generator comprising a high gain amplifier with a first resistive input circuit and a capacitive feedback circuit to produce a sawtooth output waveform having a slope dependent on the voltage applied to the first resistive input circuit and also having a second resistive input circuit associated with a resistive feedback circuit for the amplifier to produce an output signal of a constant level when a constant input voltage is applied to said second resistive input circuit, the two feedback circuits being connected together at the output of the amplifier so that the capacitive circuit is charged to a level dependent on the output level of the second resistive feedback circuit when the latter is operative and wherein the outputs of said pulse sampling demodulator means are applied to said second resistive feedback circuits.

11. A radar plan position indicator as claimed in claim 10 wherein an adjustable sine-cosine signal generator is provided for applying sine and cosine signals to the first resistive input circuits of the scanning waveform generators for the respective co-ordinate directions of deflection to produce a line trace on the screen starting from the position determined by the outputs of said pulse sampling demodulator means and extending in a direction determined by the setting of said adjustable sine-cosine signal generator.

12. A radar plan position indicator as claimed in claim 11 wherein a gate circuit is provided for determining the duration of the line trace starting from the position determined by the outputs of the pulse sampling demodulator means and wherein means are provided for varying the duration of this line trace so as to vary the length of the line trace displayed on the screen of the tube.

13. A radar plan position indicator as claimed in claim 11 wherein a gate circuit is provided for determining the duration of the line trace starting from the position determined by the outputs of the pulse sampling demodulator means and wherein means are provided for scaling the inputs from the sine-cosine signal generator to the scanning waveform generators to vary the length of the line trace displayed on the screen of the tube.

14. A radar plan position indicator as claimed in claim 2 wherein means are provided for adding to the outputs of said adjustable linearly varying voltage generating means signals representative of the components in the co-ordinate directions of the rate of movement of the marker so as to displace the marker by a predetermined amount in its direction of travel across the screen of the tube.

15. A radar plan position indicator as claimed in claim 14 wherein scanning waveform generators are provided for producing deflection signals for the deflector means of the cathode ray tube, each scanning waveform generator comprising a high gain amplifier with a first resistive input circuit and a capacitive feedback circuit to produce a sawtooth output waveform having a slope dependent on the voltage applied to the resistive input circuit and also having a second resistive input circuit associated with a resistive feedback circuit for the amplifier to produce an output signal of a constant level when a constant input voltage is applied to said second resistive input circuit, the two feedback circuits being connected together at the output of the amplifier so that the capacitive circuit is charged to a level dependent on the output level of the second resistive feedback circuit when the latter is operative, and wherein outputs of said adjustable linearly varying voltage generating means with the added signals are applied to said second resistive input circuits of the respective scanning waveform generators for the corresponding co-ordinate directions of deflection of the cathode ray beam.

16. A radar plan position indicator as claimed in claim 15 wherein an adjustable sine-cosine signal generator is provided for applying sine and cosine signals to the first resistive input circuits of the scanning waveform generators for the corresponding co-ordinate directions of deflection to produce a line trace (constituting said marker) on the screen starting from the position determined by the addition of the speed component signals to the marker position represented by the outputs of said adjustable linearly varying voltage generating means, which line trace extends in a direction determined by the setting of said adjustable sine-cosine signal generator.

17. A radar plan position indicator as claimed in claim 16 wherein a gate circuit is provided for determining the duration of the line trace constituting said marker and wherein means are provided for varying the duration of this line trace so as to vary the length of the line trace displayed on the screen of the tube.

18. A radar plan position indicator as claimed in claim 16 wherein a gate circuit is provided for determining the duration of the line trace constituting said marker and wherein means are provided for scaling the inputs from the sine-cosine signal generator to the scanning waveform generators to vary the length of the line trace displayed on the screen of the tube.

19. A radar plan position indicator as claimed in claim 1 wherein said adjustable linearly varying voltage waveform generating means comprises a pair of integrators to generate sawtooth waveforms, each comprising a high gain amplifier with a capacitive feedback circuit and a resistive input circuit and an adjustable sine-cosine signal generator arranged to feed sine and cosine voltages respectively to the resistive inputs of the two integrators.

20. A radar plan position indicator as claimed in claim 19 wherein said adjustable sine-cosine signal generator comprises an adjustable voltage supply and a sine-cosine potentiometer fed from said adjustable direct voltage supply.

21. A radar plan position indicator as claimed in claim 19 wherein each of said integrators also has a resistive feedback circuit and a second resistive input circuit switchable into operation to determine the starting level of the linearly varying voltage waveform output and wherein there is provided a second adjustable sine-cosine signal generator arranged to feed sine and cosine signals to the second resistive inputs of the two integrators respectively.

22. A radar plan position indicator as claimed in claim 21 wherein said second adjustable sine-cosine signal generator comprises a direct current supply source and a sine-cosine potentiometer fed from said direct current supply source.

23. Cathode ray tube display apparatus comprising a cathode ray display tube, first and second sine-cosine signal generators, a first waveform generator arranged to produce a linearly varying voltage output starting from a datum determined by the sine output of the first sine-cosine signal generator and having a waveform slope determined by the sine output of the second sine-cosine signal generator, a second waveform generator arranged trated in FIGURE 1 however, the sine and cosine speed to produce a linearly varying voltage output starting from a datum determined by the cosine output of the first sine-cosine signal generator and having a waveform slope determined by the cosine output of the second sine-cosine signal generator and means for deflecting the beam of the cathode ray tube in two orthogonal directions in accordance with the amplitudes of the outputs from the two waveform generators.

24. Cathode ray tube display apparatus as claimed in claim 23 wherein said means for deflecting the beam of the cathode ray tube comprises, for each of said orthogonal directions, a further waveform generator, the two further waveform generators being arranged to produce respectively sawtooth waveform outputs starting from datum levels determined by the amplitudes of the output from said first and said second waveform generators respectively and having waveform slopes determined by the sine and cosine outputs respectively of said second sine-cosine signal generator.

25. Cathode ray tube display apparatus as claimed in claim 24 wherein the outputs of said further waveform generators are applied to orthogonal deflector means of the cathode ray tube to control the position of the cathode ray beam.

26. In a cathode ray tube display system; scanning means repetitively scanning the cathode ray beam to provide display scans, marker signal generating means scanning the cathode ray beam during the intervals between the display scans to provide marker scans, waveform generating means for generating an output signal having a waveform varying slowly over a time period large compared with the display scan period and control means for said marker signal generating means operative to control the position of the start of the marker scan in accordance with the output signal of said waveform generating means so that the position of the marker scan in successive scans is gradually displaced on the screen of the tube.

27. In a radar plan position display having a cathode ray tube the beam of which is repetitively scanned to provide radar display scans; a marker signal generator operative to put an electronic marker on the display screen in intervals between radar display scans at a position determined by applied position control signals, a speed signal generator providing output signals representative of components of speed in two directions, two linear waveform generating means each generating an output signal having a waveform slowly varying linearly over a time period large compared with the radar display scan period at a rate dependent on an applied control signal, means applying the output signals from said speed signal generator respectively to the two linear waveform generating means to control the respective waveform slopes, and means for applying the output signals from said waveform generating means to said marker signal generator as position control signals whereby the marker in successive marker scans is gradually displaced across the screen of the tube.

28. In cathode ray tube display apparatus having a cathode ray tube with fixed orthogonal deflector means for deflecting the cathode ray beam across the screen of the tube in a line scan in a direction determined by two deflection signals synchronously applied respectively to orthogonal deflector means; first and second waveform generators arranged to produce synchronous linearly varying voltage waveforms, first adjustable control means controlling said waveform generators to vary the starting levels of the two waveforms, second adjustable control means controlling said waveform generators to vary the relative waveform slopes of the two waveforms, means for applying said voltage waveforms to said deflector means to produce a line scan on the screen of the tube, and means for controlling the length of the line scan visibly displayed on the screen of the tube.

29. In cathode ray tube display apparatus having a cathode ray tube with fixed orthogonal deflector means for deflecting the cathode ray beam across the screen of the tube in a line scan in a direction determined by two deflection signals synchronously applied respectively to orthogonal deflector means; a first signal generator producing first and second outputs, a second signal generator producing sine and cosine signal outputs representative of an anugular direction, synchronised first and second waveform generators each having two input control circuits and an output circuit and each arranged to produce at its output circuit a linearly varying voltage waveform starting from a datum determined by a voltage applied to one input circuit and having a slope determined by a voltage applied to the second input circuit, the first waveform generator having its output circuit coupled to said deflector means to effect deflection of the cathode ray beam in one of said orthogonal directions and having its input control circuits coupled to said first and second signal generators to produce a linearly varying voltage output starting from a datum determined by the first output of said first signal generator and with a waveform slope determined by the sine output of said second signal generator, and the second waveform generator having its output circuit coupled to said deflector means for effecting deflection of the cathode ray beam in the other of said orthogonal directions and having its input control circuits coupled to said first and second signal generators to produce a linearly varying voltage output starting from a datum determined by the second output of said first signal generator and with a waveform slope determined by the cosine output of said second signal generator and means for controlling the length of the resultant line scan visibly displayed on the screen of the cathode ray tube.

30. Cathode ray tube display apparatus as claimed in claim 29 wherein said means for controlling the length of the resultant line scan visibly displayed on the screen of the cathode ray tube comprises a gating circuit for limiting the duration of said line scans and ganged adjustable potentiometers for scaling the magnitudes of the signals applied to the second input circuits of said first and second waveform generators.

31. Cathode ray tube display apparatus as claimed in claim 29 wherein said means for controlling the length of the resultant line scan visibly displayed on the screen of the cathode ray tube comprises an adjustable duration gating circuit for limiting the duration of said line scans.

References Cited in the file of this patent
UNITED STATES PATENTS

| | | |
|---|---|---|
| 2,434,264 | Edson | Jan. 13, 1948 |
| 2,448,363 | Firestone et al. | Aug. 31, 1948 |
| 2,504,852 | Lewis | Apr. 18, 1950 |
| 2,582,608 | Sherwin | Jan. 15, 1952 |
| 3,017,628 | Landee et al. | Jan. 16, 1962 |